United States Patent [19]

Rayment

[11] Patent Number: 5,551,298
[45] Date of Patent: Sep. 3, 1996

[54] IDENTIFICATION OF VIBRATION INDUCED NOISES ON VEHICLES

[75] Inventor: Kevin D. Rayment, Chelmsford, England

[73] Assignee: Ford Motor Company, Dearborn, Mich.

[21] Appl. No.: 399,050

[22] Filed: Mar. 8, 1995

[30] Foreign Application Priority Data

Mar. 9, 1994 [GB] United Kingdom ............ 9404595

[51] Int. Cl.⁶ .................................................. G01M 17/00
[52] U.S. Cl. ............................................. 73/669; 73/579
[58] Field of Search ........................ 73/669, 671, 579, 73/587, 665; 364/508, 424.05

[56] References Cited

U.S. PATENT DOCUMENTS

| | | | |
|---|---|---|---|
| 3,748,896 | 7/1973 | Barrows | 73/671 |
| 3,827,289 | 8/1974 | Borg | 73/669 |
| 4,989,455 | 2/1991 | Gomyo et al. | 73/669 |
| 5,313,407 | 5/1994 | Tiernan et al. | 364/508 |
| 5,434,783 | 7/1995 | Pal et al. | 364/424.05 |
| 5,435,185 | 7/1995 | Eagan | 73/587 |

Primary Examiner—John E. Chapman
Attorney, Agent, or Firm—David B. Kelley

[57] ABSTRACT

In order to be able to quickly identify rattles and squeaks occurring on vehicles, a vibration generator is used which causes the vehicle to be vibrated at a range of different frequencies (C). By setting up the apparatus so that the frequency range is traversed whilst a vehicle is being caused to vibrate, the frequency at which the noise begins to occur (A) can be noted, the frequency at which the noise stops occurring (B) can be noted and this information can be compared with stored data (E) to identify the source of the noise.

17 Claims, 3 Drawing Sheets

IDENTIFICATION OF VIBRATION INDUCED NOISES ON VEHICLES

FIELD OF THE INVENTION

This invention relates to a method and an apparatus for the identification of vibration induced noises on vehicles.

BACKGROUND OF THE INVENTION

Motor vehicle manufacturers aim to eliminate rattles and other undesired noises which might occur when a vehicle is in use. However since these noises only occur when the vehicle is subjected to the vibrations occurring in use, it can be difficult to track down and correct the source of such noises.

A number of different simulation systems have been developed to allow identification of noises on a test bed. Roller tests are known in which the stationary car has its wheel driven on sets of rollers, which have different surface texture at the left, center and right hand portions of the rollers. The car can also be subjected to different frequencies of vibration by changing the rotational speed of the rollers. This system has the disadvantage that it is dangerous to approach or leave the car, since its wheels are running on rollers, and it may move suddenly from side to side.

A state of the art system is the Hydropulse™ computer-controlled road simulator in which each wheel may be independently vibrated while resting on a support pillar. Each pillar can move in unison, or the pillars may be driven according to actual recorded road data. It can be very difficult to determine by ear the source of a noise, even with such controlled vibration systems, owing to the complex acoustics within the car body parts. It is known to use microphones, which may be fixed or moved around inside the test vehicle, and measure sound intensity or perform Fourier frequency analysis. It is also known to use triangulation by microphone. However, these techniques are expensive and time consuming to set up on the test vehicle, and rely heavily on operator expertise.

SUMMARY OF THE INVENTION

It is an aim of the present invention to provide a more straightforward and reliable means to identify vibration induced vehicle noises on a stationary test facility. According to the present invention there is provided apparatus for identification of vibration induced noises on vehicles, the apparatus comprising means for supporting the vehicle on its wheels, a vibration generator for vibrating the wheel supporting means, control means for controlling the frequency of operation of the vibration generator, data capture means for receiving inputs when a vibration induced noise occurs on the vehicle, and means for comparing the frequency at which the vibration induced noise occurs with a set of stored data to identify the source of the vibration induced noise.

The means for comparing the frequency at which the vibration induced noise occurs will most conveniently be a programmed computer.

It is possible to build up a set of stored data which will indicate that, for example, a noise which occurs at a frequency of between 12 and 22 Hz is likely to result from the steering column rattling against the steering column casting. The apparatus can therefore tell the operator directly what parts of the vehicle should be checked to counter the noise.

The vehicle supporting means preferably comprises four separate wheel supporting columns, each of which can be oscillated to cause the supported vehicle to be vibrated. The columns may all oscillate in a synchronized, in phase manner, at the same frequency, or they may be controlled to operate with predetermined phase differences. The vibration generator is preferably arranged to cause the vehicle support columns to oscillate and the vehicle to vibrate over a range of frequencies comparable with the range of vibration frequencies experienced by a vehicle travelling on the road. Typically this range can extend from 0 to 100 Hz.

The vibration generator is preferably hydraulically driven. The control means preferably controls the pressure produced in a hydraulic circuit, and the rate at which the pressure is reversed to produce oscillation of the vehicle wheel supporting means.

The data capture means may be triggered by an operator sitting in the passenger compartment, and the operator may use a mouse or other computer input device to indicate the starting or stopping of a noise, as the vehicle is subjected to changing vibration frequencies. The operator may also use a mouse to point to a position on a graphic representation of the car on a computer screen which has been found to be the source of the noise. The frequency control means may be set up to cycle the vehicle through the whole frequency range of the apparatus, and the data capture means may then be used to mark the starting and stopping of noise occurrence as the vehicle is cycled through the frequency range.

When a noise does occur, the apparatus may permit fine adjustment of the vibration generator frequency so that a precise starting (and stopping) frequency at which the noise occurs can be identified. The control means, the data capture means and the comparator may all be functions of a computer associated with the apparatus. The computer may display on its screen the frequency at which the vehicle is being vibrated, information from the stored data to indicate what vibration induced noises may be expected to occur at the instantaneous frequency of vibration and, when a vibration is sensed, the screen may show, derived from its stored data, a graphical representation of the vehicle with an indication of the location of the noise relative to the vehicle body.

The invention also provides a method for identification of vibration induced noises on vehicles, the method comprising the steps of vibrating the vehicle at a range of different frequencies, noting the frequencies at which a vibration induced noise appears and of a different frequency at which it disappears, and comparing the frequency over which the noise is present with stored data representing frequencies at which known vibration induced noises have been found in the past.

BRIEF DESCRIPTION OF THE DRAWING

The invention will now be further described, by way of example, with reference to the accompanying drawings, in which.

DETAILED DESCRIPTION OF THE PREFERRED EMBODIMENTS

Figure 1:
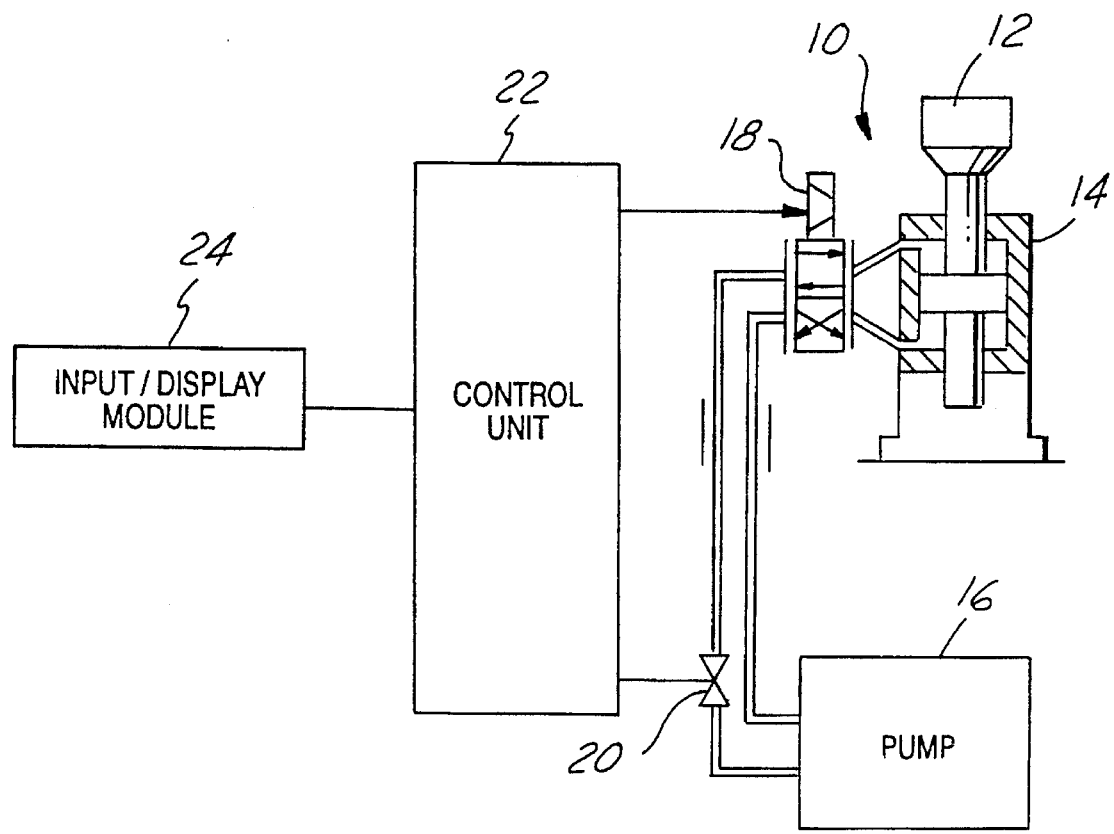
FIG. 1 is a schematic illustration of a vibration generator for use in the invention.

The vibration generator shown in FIG. 1 has four wheel support units 10 (only one is shown in FIG. 1). Each wheel support unit comprises a pad 12 mounted above a double acting piston/cylinder arrangement 14. All the wheel support units 10 are fed with hydraulic fluid from a pump 16 via a two-position servo valve 18. The valve 18 in one position admits pressure to one side of the piston of the piston/cylinder arrangement 14, and the other side to drain, and in the other position connects the other side to pressure and the one side to drain. By oscillating the servo valve, an oscillation of the pad 12 is produced which causes a vehicle supported on the pads to vibrate. An on/off valve 20 in the hydraulic circuit can also be used to control the operation. A control unit 22 controls the rate of oscillation of the servo valve 18 and the valve 20. An input/display module 24 is connected to the control unit 22, and this module 24 can conveniently take the form of a small computer with input devices (mouse, keyboard) and output devices (video display units).

In use, the vehicle to be investigated is mounted with each of its four wheels on a pad 12 of a wheel support unit 10. The most common mode of usage is to scan upwards the vibration frequency applied to the wheels in order to cover the full frequency range and excite all potential noises. The apparatus can also be used to reproduce a particular known noise by operating the vibration generator at the particular frequency (band) known to cause that noise to be produced.

Figure 3:
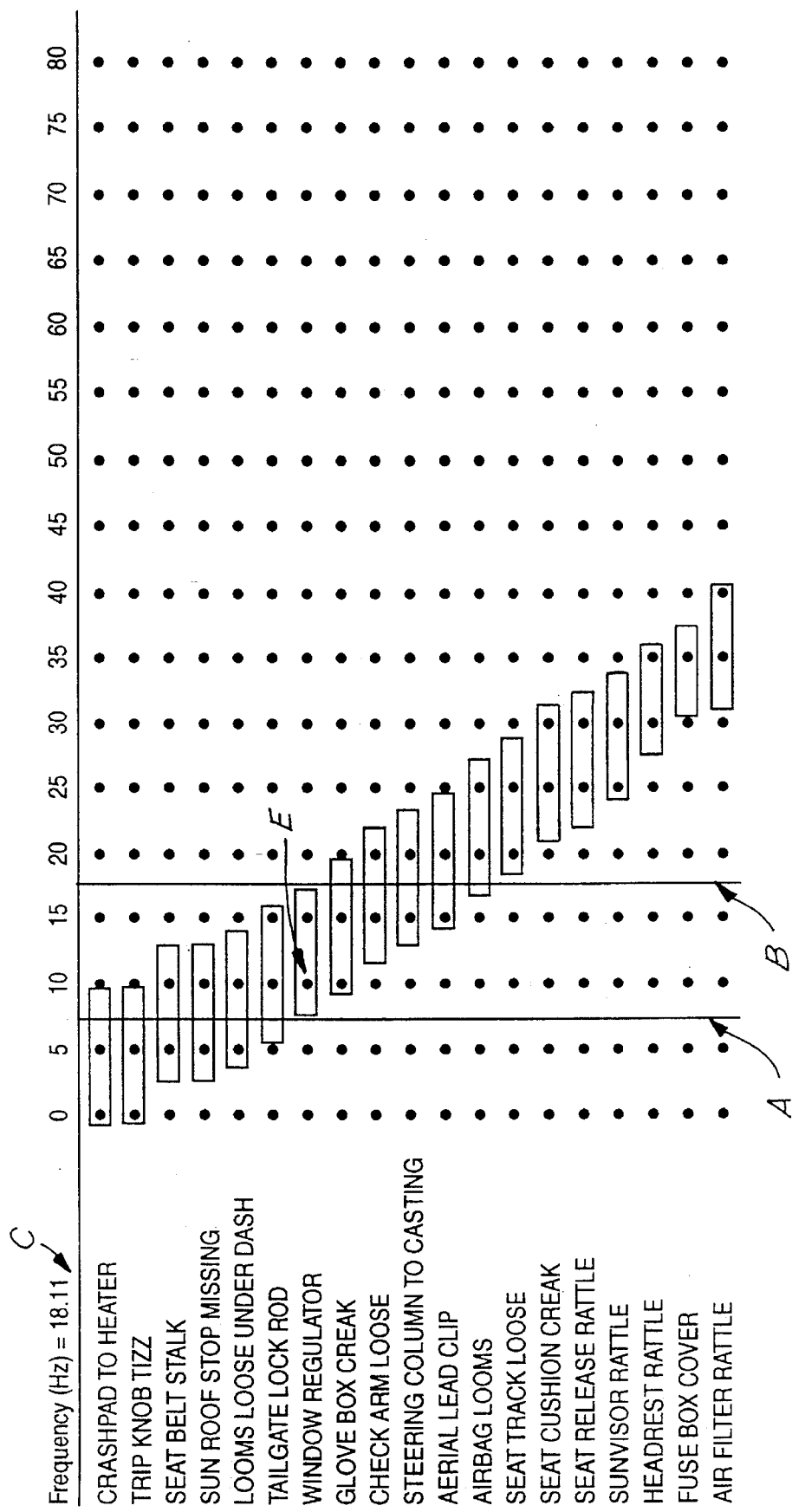

An operator will sit in the passenger compartment with the module 24. On initiating a test, the operator will see on the input/output display module 24 a screen display as shown in FIG. 3, which lists previously determined noise sources, which are termed "concerns". The vertical line A will initially appear, and can be moved across the screen from left to right to indicate the frequency of vibration to which the vehicle is momentarily being subjected. The line A is moved across the screen under the control of the operator, and when a vibration induced noise such as a rattle or a squeak is heard, then another key is pressed to fix the position of the line A, marking the lowest frequency at which the noise is heard. In order to achieve fine adjustment of the position of the line A, the computer may allow a fine adjustment mode by selection of a particular key combination. At the top of the display, at the position indicated by the letter C, there is an indication of the instantaneous vibration frequency.

Once the position of the line A has been fixed, continuing change in the frequency of vibration will result in movement of a new vertical line B across the screen from left to right. When the rattle or squeak being monitored ceases, the position of the line B is fixed in the same way as the position of the line A was previously fixed. Line A and line B are two data points, which will be referred to below as a low-high measurement.

If the lines A and B are fixed in the positions shown on FIG. 3, then one likely cause of the rattle being observed is the Window Regulator concern, because the boxed area E on FIG. 3 represents low-high measurements previously determined for this concern, and the start and end lines A and B register closely with this area. The boxed areas for all the concerns each represent one data set from a database of previous low-high measurements, which may be fixed from an initial investigation of concerns, or be formed from running averages from the last 25 low-high measurements for each concern. Each individual low-high measurement has a Mean Frequency and a Frequency Range, with the mean being the average frequency of the low and high frequencies, and the range being the difference of these frequencies. The data sets of previous means and previous ranges have in practice been found to be well-approximated by a fitted normalized normal distribution curve. Both of these curves have a mean and a standard deviation. The boxed area E represents the bounds at the ±3σ points for the Mean Frequency distribution curve. It has been found in practice that the match of the low-high measurement to this curve is more important than the match to the Frequency Range distribution curve, and so the bounds of this curve are not shown on the display of FIG. 3.

Also not shown in FIG. 3 is another data set, which is the relative occurrence of each concern with respect to all the other concerns. Some concerns will occur more frequently than others, and this information is useful in helping to determine which concern is most likely for a particular low-high measurement.

The input/output display module 24 will perform a calculation based on the database of mean frequency, frequency range and relative occurrence and then list on the display in order the most likely concerns for the measured noise. In the example shown in FIG. 3, the concern Window Regulator may, or may not, be the most likely, depending on the outcome of these calculations. In the following description, the Window Regulator is taken to be the most likely concern.

Figure 2:
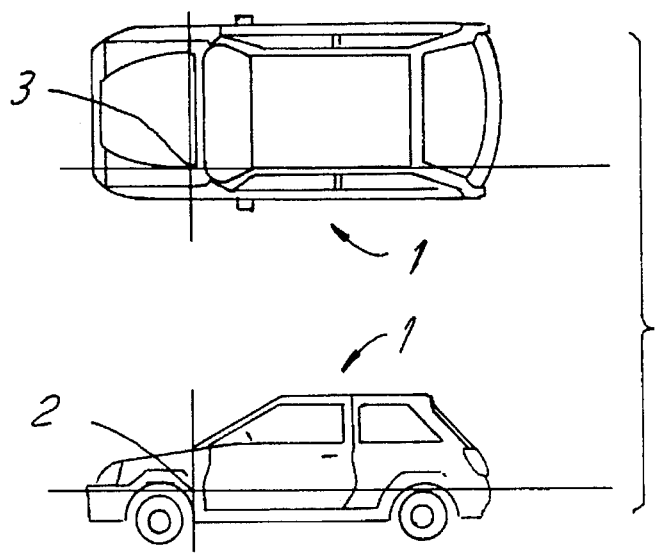
FIGS. 2 and 3 illustrate different forms of output achieved by an apparatus of the invention.

On setting the final position of the line B, which marks the end of that phase of the test, the calculation is performed and the screen displays to the operator the question: "Is the source of this noise the Window Regulator? Y/N". A screen display similar to that shown in FIG. 2 will graphically illustrate the car 1 with cross-hairs 2, 3 to show the region from which this noise is likely to be produced. The operator will then check the Window Regulator. If the noise is coming from this concern, action will be taken to stop the noise, and the operator will then answer the question on the screen in the affirmative. If this was not the right concern and the noise continues to be heard, the screen can suggest the next most likely source, for example the Tailgate Lock Rod. The operator will again investigate and answer the question on the screen with either "yes" or "no". The process continues until the correct concern is identified.

In order for the apparatus to operate in this way, it must access the database. The database can be built by putting a number of similar vehicles through a test routine where rattles and squeaks are found, their sources identified and their characteristics in terms of position of origin and frequency of occurrence recorded. A suitable database can be built in this way, and the database can be self-instructing in that it can learn from the answers given by operators during use.

The use of this apparatus allows quick and accurate determination of the source of a rattle or squeak, and gives a high probability that the source identified is the correct source. The necessary remedial action (which may be for example lubrication of the component concerned or tightening of an insufficiently tight fastening) can then be taken to prevent the rattle or squeak reappearing.

Where rattles or squeaks from two or more sources have overlapping frequency ranges, then the apparatus described can store the characteristics of the two noises and can display the identified frequencies graphically. In use, first one of the overlapping noise sources will be suggested by the apparatus, and if the operator finds that this source is not causing the noise, then the apparatus will suggest one of the other noises having the same frequency of occurrence.

Figure 4:
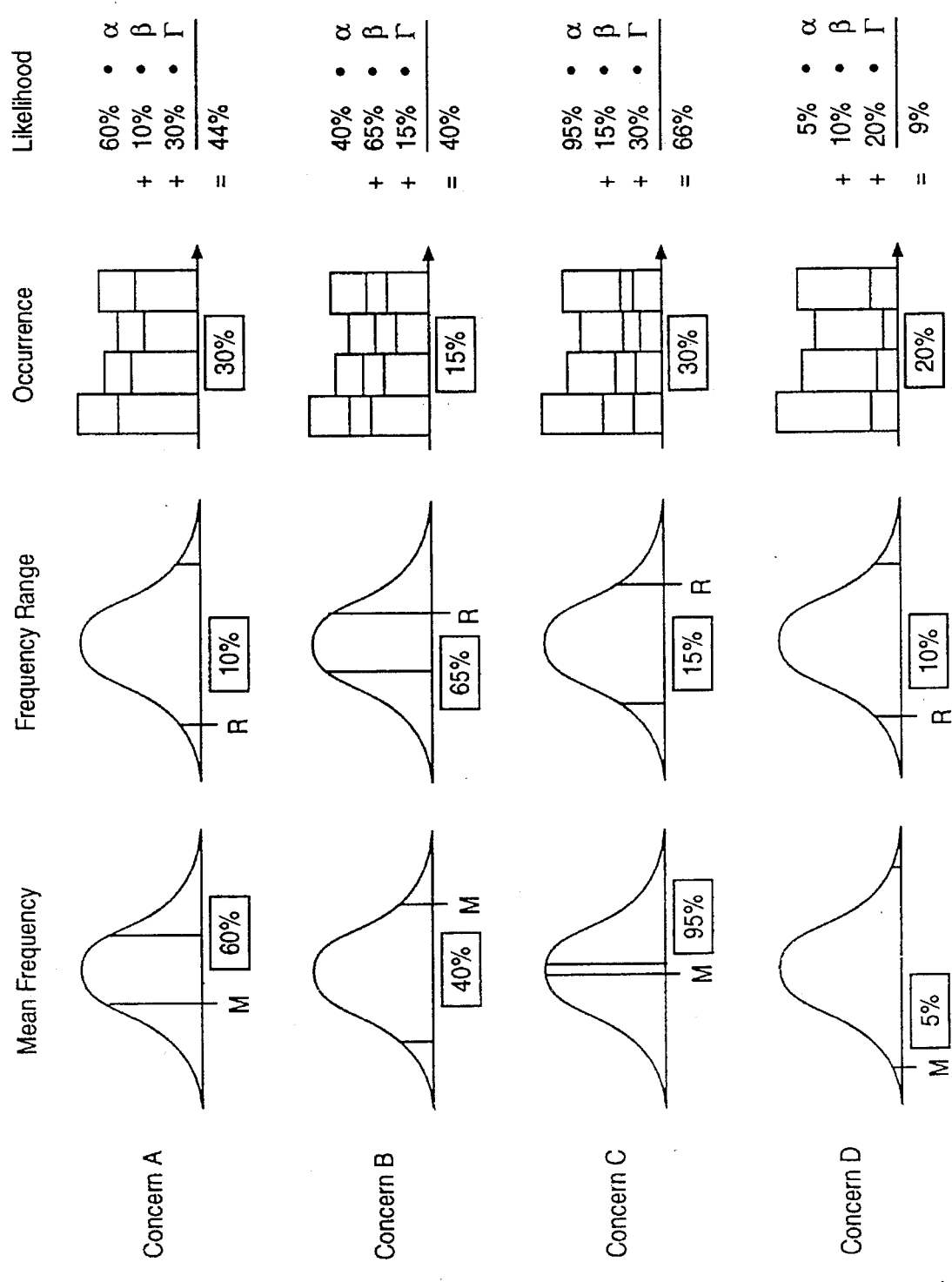
FIG. 4 illustrates the method by which the output is calculated.

FIG. 4 shows how the calculation is performed on the mean frequency, frequency range and occurrence. database. Four previously identified concerns, Concerns A to D are listed in the database. A low-high measurement is performed, which results in a Mean value M and a Range value R, where M is the average of the low and high frequency values, and R is the difference between the low and high values. The M and R values are placed on the mean frequency and frequency range distribution curves to see how close they fit the previously measured data. An exact fit to a concern would be if M and R were centered on their respective curves, and the calculation would yield 100% for both fits. Usually, M and R will lie somewhat off center, and the fit value for each is calculated by measuring the area from M or R to the nearest tail of the distribution, then doubling this value and normalizing it to the total area under the curve. This gives two percentage values. A third percentage value representing the relative occurrence for each concern is recalled from memory.

Depending on the assumptions made regarding these three values, they may be combined by addition or multiplication to yield a final value representing the likelihood that a particular concern is responsible for the noise.

It has been found empirically that a reliable prediction is obtained if these three percentages each are weighted by a factor $\alpha$, $\beta$ or $\Gamma$ and then summed together. The factors $\alpha$, $\beta$ or $\Gamma$ are each initially set to be equal to ⅓. This initial value of ⅓ is calculated from a stored string of 25 values of ⅓, added together and then divided by 25. Once the correct concern amongst Concerns A to D is identified by the operator, each string for $\alpha$, $\beta$ and $\Gamma$ is modified according to the following formulae:

$$\alpha' = \{x_n + x_{n-1} + x_{n-2} + \ldots + x_{n-24}\}/25$$
$$\beta' = \{y_n + y_{n-1} + y_{n-2} + \ldots + y_{n-24}\}/25$$
$$\Gamma' = \{z_n + z_{n-1} + z_{n-2} + \ldots + z_{n-24}\}/25$$

The x, y and z are the string values which are all initially set to ⅓. The $\alpha'$ $\beta'$ and $\Gamma'$ will be the factors for the next low-high measurement, the string values $x_n$, $y_n$ and $z_n$ are, respectively, the calculated percentages for the present correctly identified concern's mean frequency, frequency range and occurrence. For subsequent low-high measurements, the string values x, y and z will fill up with the corresponding previous calculated percentages for the correct identification of concerns. In this way, the calculation becomes weighted towards the percentages which have previously been a good indication of the likelihood for concerns.

I claim:

1. An apparatus for identification of vibration induced noises on vehicles, the apparatus comprising wheel supporting means for supporting a vehicle on its wheels, a vibration generator for vibrating the wheel supporting means, control means for controlling the frequency of operation of the vibration generator, data input means for receiving input when a vibration induced noise occurs on the vehicle, data storage means for storing a set of stored data representing frequencies at which known vibration induced noises occur, and comparator means coupled to the data input means and the data storage means for comparing the frequency at which the vibration induced noise occurs with a set of stored data to identify the source of the vibration induced noises.

2. An apparatus as claimed in claim 1, wherein the vehicle supporting means comprises four separate wheel supporting columns, and the vibration generator comprises means to oscillate each of said columns.

3. An apparatus as claimed in claim 2, wherein oscillation means are arranged to oscillate all the columns (12) in a synchronized manner, at the same frequency.

4. An apparatus as claimed in claim 2, wherein the oscillation means are arranged to oscillate the columns at the same frequency, but out of phase with each other.

5. An apparatus as claimed in claim 2, wherein the control means operates to control the vibration generator to vibrate over a range of frequencies comparable with the range of vibration frequencies experienced by a vehicle traveling on the road.

6. An apparatus as claimed in claim 5, wherein the range of frequencies is from 0 to 100 Hz.

7. An apparatus as claimed in claim 1, wherein the vibration generator includes hydraulic drive means.

8. An apparatus as claimed in claim 7, wherein the control means controls both the hydraulic drive means to control both the pressure produced in the hydraulic drive means, and the rate at which the pressure is reversed to produce oscillation of the vehicle wheel supporting means.

9. An apparatus as claimed in claim 1, which further includes a manually activated computer input device coupled to the data input means to trigger the data input means.

10. An apparatus as claimed in claim 1, wherein the control means operates to cause the vibration generator to vibrate through the whole frequency range of the apparatus, and the data input means is adapted to mark the starting (A) and stopping (B) of noise occurrence as the vibration generator is cycled through the frequency range.

11. An apparatus as claimed in claim 10, further including fine adjustment means coupled to the vibration generator, to finely adjust the frequency of vibration so that a precise starting (A) and stopping (B) frequency at which the noise occurs can be identified.

12. An apparatus as claimed in claim 1, further comprising a computer, and in which the control means, the data input means and the comparator means all comprise parts of the computer comparing the frequency are all functions of a computer.

13. An apparatus as claimed in claim 12, wherein the computer includes a display screen, the control means operates to cause the vibration generator to vibrate through a whole frequency range of the apparatus and the data input means operates to mark the starting (A) and stopping (B) of noise occurrence as the vibration generator is cycled through the frequency range, and in which the computer operates to display simultaneously on its screen the frequency at which the vehicle is being vibrated, the frequencies at which a noise begins to occur (A) and stops occurring (B), and information from the stored data to indicate the vibration induced noises expected to occur over the frequency (A) and the frequency (B).

14. An apparatus as claimed in claim 13, wherein when a vibration induced noise is indicated, the computer operates to display on the screen a graphical representation of the vehicle with an indication of the location of the noise relative to the vehicle body.

15. A method for identification of vibration induced noises on vehicles, the method comprising the steps of vibrating the vehicle (1) at a range of different frequencies, noting the frequency at which a vibration induced noise appears (A) and of a different frequency at which it disappears (B), and comparing the frequencies over which the noise is present with stored data representing frequencies at which known vibration induced noises occur.

16. An apparatus for identification of vibration induced noises on vehicles, the apparatus comprising:

(a) wheel supporting means for supporting a vehicle on its wheels;

(b) a vibration generator for vibrating the wheel supporting means; and (c) an electronic computer system having:

(i) control means for causing the vibration generator to vibrate the wheel supporting means through a frequency range of 0 to approximately 100 Hertz;

(ii) data input means for receiving input when a vibration induced noise occurs on the vehicle to mark the starting and stopping of noise occurrence as the vibration generator is cycled through the frequency range;

(iii) data storage means for storing a set of stored data representing frequencies at which known vibration induced noises occur;

(iv) comparator means coupled to the data input means and the data storage means for comparing the frequency at which the vibration induced noise occurs with a set of stored data to identify the source of the vibration induced noises; and (v) a display screen to simultaneously display a frequency at which the vehicle is being vibrated, the frequencies at which a noise begins to occur (A) and stops occurring (B), and portions of the stored data to indicate the vibration induced noises expected to occur over the frequency (A) and the frequency (B).

17. An apparatus as claimed in claim 16 wherein, when a vibration induced noise is indicated, the computer operates to display on the screen a graphical representation of the vehicle with an indication of the location of the noise relative to a body portion of the vehicle.

* * * * *